(12) United States Patent
Marcil

(10) Patent No.: US 8,683,987 B2
(45) Date of Patent: Apr. 1, 2014

(54) LIGHT TURBO COMPOUND ENGINE VARIANT

(75) Inventor: Jean-Pierre Marcil, Beauharnois (CA)

(73) Assignee: R & D Machma Inc., Beauharnois (CA)

( * ) Notice: Subject to any disclaimer, the term of this patent is extended or adjusted under 35 U.S.C. 154(b) by 152 days.

(21) Appl. No.: 13/501,887

(22) PCT Filed: Oct. 14, 2010

(86) PCT No.: PCT/CA2010/001609
§ 371 (c)(1),
(2), (4) Date: Apr. 13, 2012

(87) PCT Pub. No.: WO2011/044683
PCT Pub. Date: Apr. 21, 2011

(65) Prior Publication Data
US 2012/0198836 A1  Aug. 9, 2012

Related U.S. Application Data

(60) Provisional application No. 61/251,358, filed on Oct. 14, 2009.

(51) Int. Cl.
*F02B 37/00* (2006.01)
*F02B 37/12* (2006.01)
*F02B 33/44* (2006.01)

(52) U.S. Cl.
USPC ........ 123/572; 123/573; 123/574; 123/198 C; 60/600; 60/602; 60/605.1

(58) Field of Classification Search
USPC ........ 123/572, 573, 574, 198 C; 60/600, 602, 60/605.1
See application file for complete search history.

(56) References Cited

U.S. PATENT DOCUMENTS

| | | | | |
|---|---|---|---|---|
| 6,431,157 | B1 * | 8/2002 | Marcil | 123/568.11 |
| 7,051,721 | B2 * | 5/2006 | Tomita et al. | 123/572 |
| 7,438,064 | B2 * | 10/2008 | Borchardt et al. | 123/572 |

FOREIGN PATENT DOCUMENTS

| | | |
|---|---|---|
| DE | 3914373 C1 | 8/1990 |
| DE | 102008061058 A1 | 7/2010 |

* cited by examiner

*Primary Examiner* — Noah Kamen
*Assistant Examiner* — Grant Moubry
(74) *Attorney, Agent, or Firm* — Goudreau Gage Dubuc; Gonzalo Lavin

(57) ABSTRACT

Otto intake-cycle controlled-air (throttled) internal combustion engines suffer from parasitic pumping losses associated with partial vacuums developed in their intake manifolds and in the cylinders above their pistons. To solve this problem, there is provided individually partitioned dry-sump crankcases dynamic pneumatic coupling pressure reduction cycle system and method that reduce the damaging parasitic effects of the differential pressure about a piston head during an intake cycle which is a source of part-load pumping-loss friction. This closed loop system includes an independent supplemental mechanical fail-safe system of a turbo-compound engine variant for pneumatic coupling of individual cylinder-crankcase volumes. It does not alter the cylinder homogeneous mixture charge integrity and stability. The system is applicable to several engine configurations, such as controlled air intake or uncontrolled air intake combustion engines, using different fuel types, either in liquid or in gazeous state.

32 Claims, 13 Drawing Sheets

LIGHT TURBO COMPOUND ENGINE VARIANT

CROSS-REFERENCE TO RELATED APPLICATIONS

This application is a National Entry Application of PCT application no PCT/CA2010/001609 filed on Oct. 14, 2010 and published in English under PCT Article 21(2), which itself claims benefit of U.S. provisional application Ser. No. 61/251,358, filed on Oct. 14, 2009. All documents above are incorporated herein in their entirety by reference.

FIELD OF THE INVENTION

The present invention relates to a turbo-compound engine variant. In particular, there is provided a closed-loop Otto intake cycle synchronized pneumatic coupling crankcase pressure cycle reduction system and method for neutralizing the pressure difference exerted on opposite faces of a piston during the intake cycle to eliminate pumping-loss friction of a throttled multiple cylinder internal combustion engine operating at part-load.

BACKGROUND OF THE INVENTION

Spark ignited (S.I.) Otto Cycle throttled internal combustion engines suffer from parasitic pumping losses associated with partial vacuums developed in their intake manifolds and in the cylinders above their pistons, as is illustrated in FIG. 1. This drawback is most prevalent when an Otto cycle engine is operated at part-load with the throttle partially closed. During each intake cycle of a throttled engine operating at part-load, extra work must be done by the piston as it draws the air-fuel mixture from the intake manifold into the volume expanding cylinder to counteract a force on the opposing face of the piston due to a pressure imbalance existing in the cylinder volume above the piston and in particular the crankcase volume below the piston. This extra work negatively affects the engine's specific fuel consumption and its level of anthropogenic emission and is the major drawback for vehicles requiring the use of larger displacement throttled engines in extended range operations and in engine applications requiring a wide flat responsive power curve.

To overcome these and other drawbacks, engine design has evolved away from the use of throttled internal combustion engines and towards the use of systems without throttle plates, which restrict incoming air supply, such as diesel and direct fuel injection engines, as illustrated in FIG. 2. However, direct fuel injection engines require sensitive components such as precise electronic fuel control systems, sensors, high pressure fuel pumps, and high pressure rapid fuel injectors that are costly and not inherently fail-safe. Likewise, diesel engines create high pressure combustion strains due to their inherent high compression and compressive shock generation which mandates a heavier, robust and costlier construction and further produce high levels of Nitrogen ($NO_x$) emissions and dangerous cancerous particulates. Still, spark ignited prior art engines have only partially addressed the drawbacks related to pumping-loss by employing cylinder-on-demand engines, interconnecting cylinders for pressure equalizations by employing the natural pumping action of a reciprocating cylinder to displace air between cylinders, and by employing crankcase pumping systems for pumping fluid from the crankcase to ambient. However, such prior art systems do not fully eliminate throttled induced pumping-losses.

Also, prior turbo-compound engines used to recuperate energy from the exhaust gas by employing an exhaust gas flow turbine suitably coupled through a gearbox to the engine crankshaft are also known. However, such turbo-compound engines are not designed nor effective for part-load throttled engine operation and must primarily operate at high engine loads and employ high-ratio reduction gearbox couplings that add weight, complexity and cost to an engine.

What is therefore needed, and one object of the present invention, is a pneumatic coupling crankcase pressure reduction system and method so as to reduce the damaging parasitic effects of the differential pressure about a piston head during an intake cycle which is a source of part-load pumping-loss friction by providing an independent, supplemental, mechanical, fail-safe system comprising a turbo-compound engine variant for the pneumatic coupling of individual crankcase volumes that does not alter the cylinder charging integrity and stability.

SUMMARY OF THE INVENTION

More specifically, in accordance with the present invention, there is provided, an Otto cycle throttled internal combustion engine (12) comprising a pump (58) comprising an input (56) and an output (62), at least two enclosed and individually partitioned cylinder crankcases (46, 48, 50, 52) in pneumatic closed loop connection, each defining an air volume between an underside of a piston (18), a wall of a cylinder (16), and a crankshaft bearing support girdle (68), at least two evacuation conduits (54) in pneumatic series connection with the individually partitioned cylinder crankcases (46, 48, 50, 52) and with the input (56). There is further provided at least two expansion conduits (60) in pneumatic series connection with the individually partitioned cylinder crankcases (46, 48, 50, 52) and with the output (62), at least two synchronized evacuation valves (64) disposed between the individually partitioned cylinder crankcases (46, 48, 50, 52) and the evacuation conduits (54), the evacuation valves (64) being operable between an open position for allowing air flow from the individually partitioned cylinder crankcases (46, 48, 50, 52) and into the evacuation conduits (54) and a closed position for restricting air flow from the individually partitioned cylinder crankcases (46, 48, 50, 52) and into the evacuation conduits (54). There is even further provided at least two synchronized expansion valves (66) disposed between the individually partitioned cylinder crankcases (46, 48, 50, 52) and the expansion conduits (60), the expansion valves (66) being operable between an open position for allowing air flow into the individually partitioned cylinder crankcases (46, 48, 50, 52) and a closed position for restricting air flow into the individually partitioned cylinder crankcases (46, 48, 50, 52). The air volume of an individually partitioned cylinder crankcase is evacuated by the pump (58) when the evacuation valve (64) of the individually partitioned cylinder crankcase undergoing an intake stroke is open and displaced to an air volume of an individually partitioned cylinder crankcase undergoing an exhaust stroke when the expansion valve (66) of the individually partitioned cylinder crankcase undergoing an exhaust stroke is simultaneously open.

There is also disclosed a method for neutralizing the pumping-loss in an Otto cycle throttled internal combustion engine comprising at least two enclosed and individually partitioned cylinder crankcases (46, 48, 50, 52) in pneumatic closed loop connection, each defining an air volume between an underside of a piston (18), a wall of a cylinder (16), and a crankshaft bearing support girdle (68). The method also comprises controlling at least two synchronized evacuation valves (64) disposed between the individually partitioned cylinder crankcases (46, 48, 50, 52) and the pump (58), the evacuation valves (64) being operable between an open position for allowing air flow from the individually partitioned cylinder crankcases (46, 48, 50, 52) and a closed position for restricting air flow from the individually partitioned cylinder crankcases (46, 48, 50, 52) into the pump (58), and also comprises controlling at least two synchronized expansion valves (66) disposed between the individually partitioned cylinder crankcases (46, 48, 50, 52) and the pump (58), the expansion valves (66) being operable between an open position for allowing air flow into the individually partitioned cylinder crankcases (46, 48, 50, 52) and a closed position for restricting air flow into the individually partitioned cylinder crankcases (46, 48, 50, 52) from the pump (58). A pump is provided to evacuate the air volumes of the individually partitioned cylinder crankcases that are undergoing an intake cycle when the evacuation valves (64) of the individually partitioned cylinder crankcases that are undergoing an intake cycle are open and displacing the evacuated air volumes to the individually partitioned cylinder crankcases that are undergoing an exhaust cycle when the expansion valves (66) of the individually partitioned cylinder crankcases undergoing an exhaust cycle are simultaneously open.

Other objects, advantages, and features of the present invention will becomes more apparent upon reading of the following non-restrictive description of specific embodiments thereof, given by way of example only with reference to the accompanying drawings.

DETAILED DESCRIPTION OF THE ILLUSTRATIVE EMBODIMENTS

Figure 1:
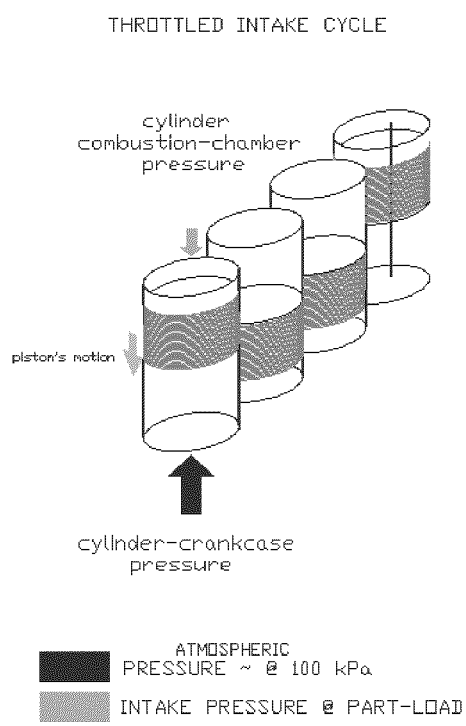
FIG. 1 is a perspective view of a known Spark ignited Otto Cycle internal combustion engine comprising a throttled intake illustrating the pressures about the faces of a piston head.
Figure 2:
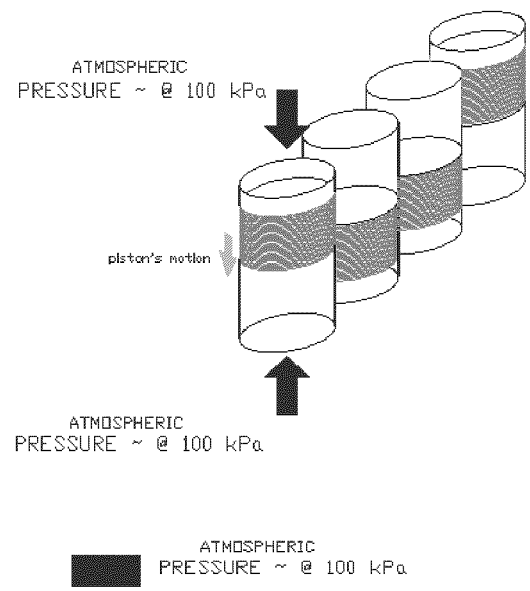
FIG. 2 is a perspective view of a known Intake Cycle Un-Controlled-Air (non-throttled) diesel or direct fuel injection engine illustrating the pressures about the faces of a piston head.
Figure 3:
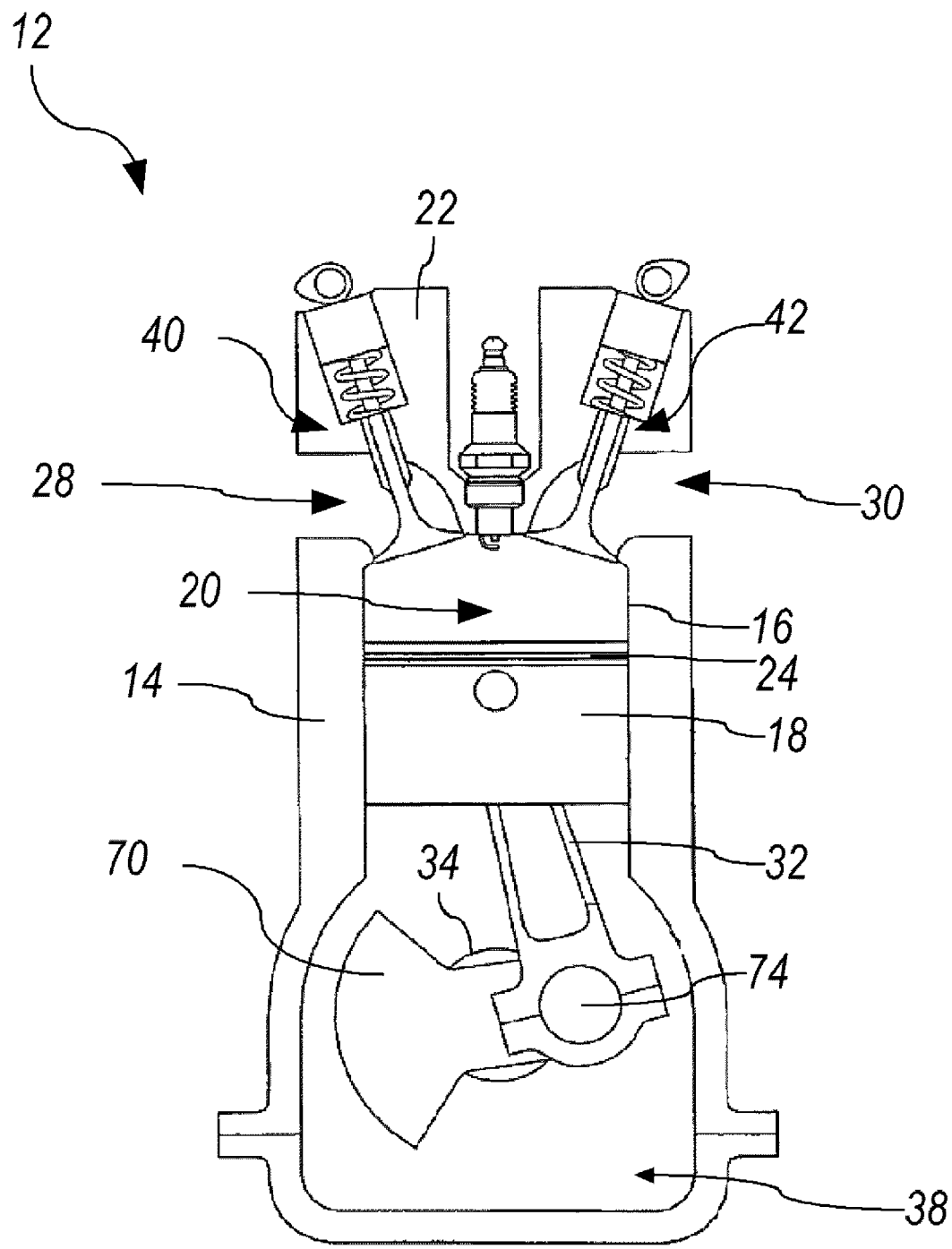
FIG. 3 is a side cross-sectional view of an internal combustion engine.

Referring now to FIG. 3, a light turbo-compound engine, in accordance with an illustrative embodiment of the present invention will be described. The Light Turbo Compound engine variant (LTCev), generally referred to using the reference numeral 10, is used to neutralize the pumping loss friction negatively affecting the specific fuel consumption and the level of anthropogenic emissions of an S.I. Otto Cycle throttled internal combustion engine 12 when operated at a reduced power, in particular at part-load. The engine 12 is illustratively a normally aspirated spark ignited Otto cycle internal combustion engine with an in-line four cylinder configuration and a 1-3-4-2 firing order comprising an engine block 14 defining a plurality of combustion cylinders as in 16 comprising a displacement for housing a piston 18 such that a combustion chamber 20 is defined between the walls of the cylinder as in 16, the top of the piston as in 18, and a cylinder head 22 further comprising a cylinder head cover (not shown) for defining a cylinder head volume. There is further provided a plurality of piston rings as in 24 which seal the combustion/expansion chamber 20. Of note, the number of cylinders as in 16 depends on the particular application, for instance, a 4-cylinder engine 12 would include four combustion cylinders as in 16 whereas a 6-cylinder engine would include six combustion cylinders as in 16. In particular, the engine 12 may illustratively be employed as an engine used in light personal aircraft for extended operational ranges and operating at various engine loads normally associated with flight, and which is predominately operated at a moderate engine load. Additionally, the engine 12 may be illustratively employed as part of an electric hybrid's internal combustion engine for more fuel efficient extended range personal transportation vehicles or to reduce the need for large batteries compromising heavy payloads, for instance, in a responsive and powerful hybrid pick-up truck which requires heavy storage batteries. More generally, the hereinabove described Otto cycle internal combustion engine 12 may be employed for various usages such as for personal transportation vehicles wherein a wide power curve responsive engine 12 is operated predominately at part-load engine power but also for responsive non-sustained but occasional high power applications. In accordance with an alternative illustrative embodiment of the present invention, while a 4-cylinder combustion engine is shown, it should be appreciated that the engine 12 may comprise other multiple cylinder configurations or type of internal combustion engine, for example a gasoline, natural gas, or liquefied gas engine comprising at least two cylinders as in 16 and in a variety of other engine configurations, such as Vs, boxermotors, or the like.

Still referring to FIG. 3, the internal combustion engine 12 further comprises an intake manifold (not shown) and an exhaust manifold 26. The intake manifold provides fluid, for example air or an optimized stoichiometric fuel/air mixture, to the combustion cylinders as in 16 via an intake port as in 28 located on the cylinder head 22. The intake manifold may also serve as a mount for a carburetor or a throttle body (not shown). The exhaust manifold 26 receives exhaust fluid, for example exhaust gas, from the combustion cylinders as in 16 via an exhaust port as in 30 and collects the engine exhaust from the plurality of cylinders as in 16 and may illustratively deliver the exhaust to a normal turbocharger (not shown) and then onto an exhaust pipe (not shown), or directly to an exhaust pipe. The combustion cylinder as in 16 houses the piston as in 18 which is slidably movable within the cylinder as in 16. A connecting rod 32 couples the piston as in 18 to a crankshaft 34 that is rotatably disposed within the engine block 14 so that the sliding motion of the piston 18 within the cylinder as in 16 results in a rotation of the crankshaft 34 which is generally coupled to the transmission of a vehicle to impart movement thereof. In particular, the crankshaft 34 rests on a plurality of main bearing caps 36 which are strategically coupled to the engine block 14 to allow a rotation of the crankshaft 34.

Still referring to FIG. 3, the rotation of the crankshaft 34 results in a sliding motion of the piston 18 as is now described. In particular, an uppermost position of the piston as in 18 in the cylinder as in 16 corresponds to a top dead center position of the crankshaft 34 and a lowermost position of the piston as in 18 in the cylinder as in 16 corresponds to a bottom dead center position of the crankshaft 34. As is generally known in the art, the piston as in 18 in a conventional Otto cycle engine 12 reciprocates between the uppermost position and the lowermost position during a combustion or expansion stroke, an exhaust stroke, an intake stroke, and a compression stroke. In particular, the crankshaft 34 rotates from the top dead center position to the bottom dead center position during the combustion stroke, from the bottom dead center to the top dead center during the exhaust stroke, from top dead centre to bottom dead center during the intake stroke, and from bottom dead center to top dead center during the compression stroke. Then, the four-stroke Otto cycle is repeated. During this cycle, fuel is burned to heat compressed air within the combustion chamber as in 20 and the generated hot gas expands to force the piston as in 18 to travel downwardly and upwardly in the cylinder as in 16 in the aforementioned described motions. Of note, it is during the combustion and expansion cycles wherein useful work is generated and translated to the crankshaft 34 for its rotation.

Still referring to FIG. 3, there is further provided a wet crankcase 38 connected to the bottom of the engine block 14 for housing the crankshaft 34 and comprising a suitably configured dry-sump crankcase volume ratio primarily filled with air and some stray oil. In particular, the larger wet crankcase 38 houses the oil sump (not shown) and recuperates dry-sump stray oil collected from pressurized oil fed to the oil main bearings and rod bearings. The wet crankcase 38 generally forms the largest cavity volume in the engine 12. During normal engine 12 operation, a small amount of burned fuel and exhaust gas, which is generally referred to as blow-by, in addition to water, escapes around the piston rings as in 24 as a result of the high pressure generated by the burning gasoline vapor in the combustion chamber 20, and in turn enters the volume of the wet crankcase 38. Of note, it is generally desirable to prevent blow-by gas from remaining within the volume of the wet crankcase 38 and condensing, as oil would become more diluted over time thereby decreasing its ability to lubricate the moving parts of the engine 12. Also, condensed water vapor would cause parts of the engine 12 to rust.

Still referring to FIG. 3, the cylinder as in 16 comprises at least one intake port as in 28 and at least one exhaust port as in 30 wherein each open to the combustion chamber as in 20 such that exhaust gas volume is directed to the engine exhaust manifold 26, and thereafter to a tail pipe or optionally to a second turbocharger as is generally known in the art to provide compressed air for the engine 12. Additionally, the intake port as in 28 may be opened and closed by an intake valve assembly as in 40 and the exhaust port as in 30 may be opened and closed by an exhaust valve assembly as in 42. The intake valve assembly 40 may be movable between open and closed positions to permit fluid flow from an intake manifold to the combustion chamber as in 20. There is further provided an inlet manifold in communication with the intake port as in 28 to form an inlet passage (not shown) in which a throttle valve (not shown) is mounted. The throttle valve, which is typically a butterfly valve, is positioned at the entrance of the intake manifold and is designed to manage the flow of a fluid by constriction or obstruction of the inlet passage to thereby regulate the power of the engine 12 by, particularly, restricting inlet gases and/or fuel mixtures into the combustion chamber as in 20. Of note, when a throttle valve is wide open, in that it presents a minimum restriction to the flow of air or air/fuel mixture, the intake manifold is usually at ambient atmospheric pressure.

Figure 4:
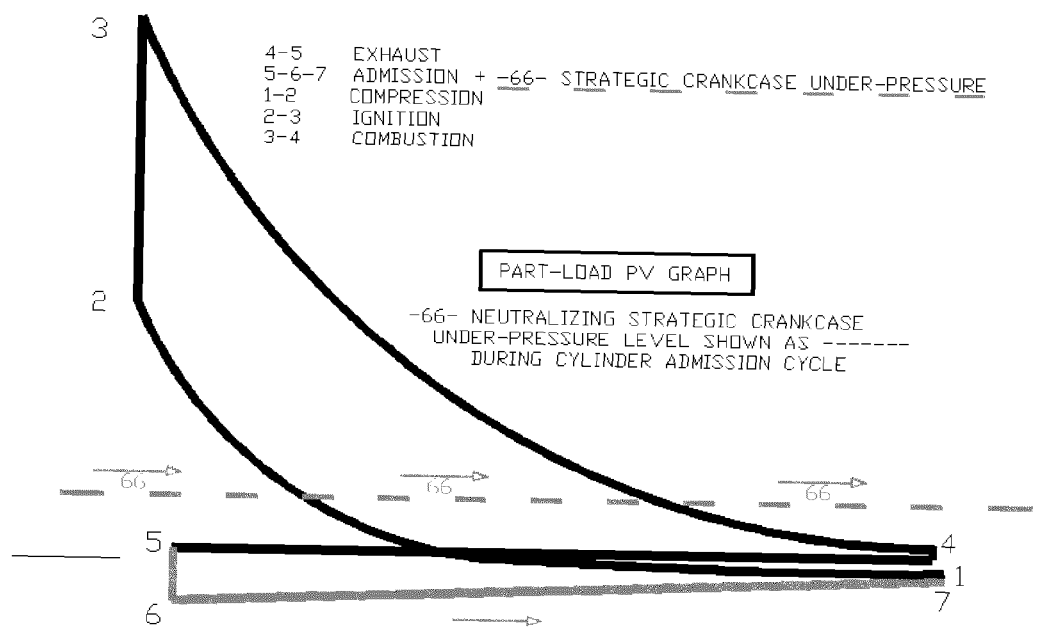
FIG. 4 is a pressure volume PV diagram for an Otto cycle illustrating the strategic crankcase under-pressure in accordance with the illustrative embodiment of the present invention.
Figure 5:
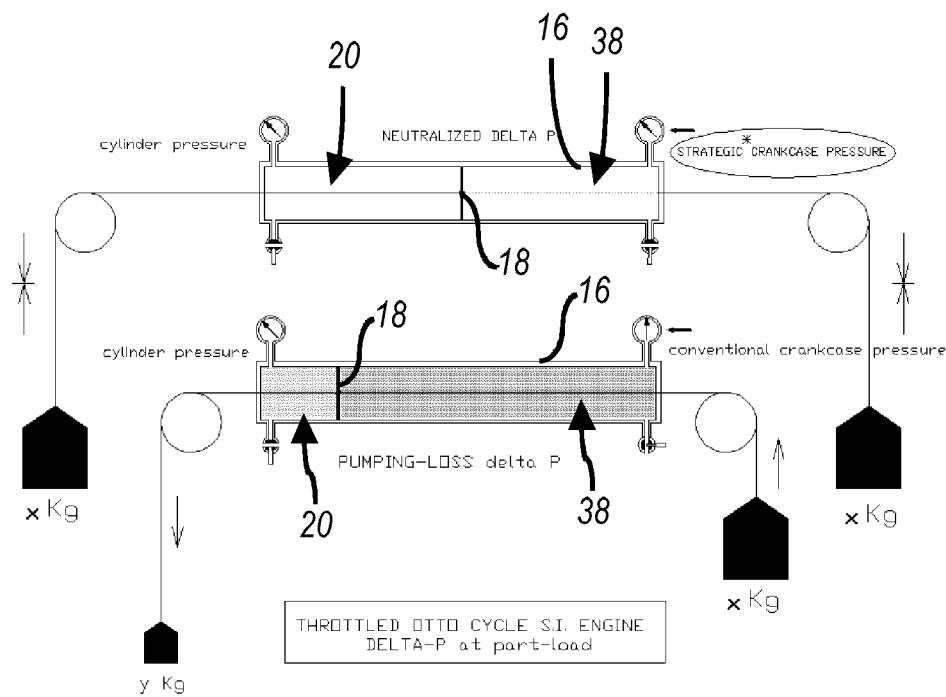
FIG. 5 is a mechanical model illustrating the pumping forces due to the pressure differential about the faces of a piston head of a Spark Ignited Otto Cycle internal combustion engine.

Now referring to FIG. 4 and FIG. 5, the operation of the engine 12 under part-load wherein throttle is proportionally closed and maintained to impede the normal air-flow into the cylinder as in 16 and to thus reduce engine power, or load, is described. During the intake cycle 5-6-7, the pressure in the cylinder as in 16 momentarily drops to point $P_x$. During the compression stroke 1-2 beginning at point 1, the pressure from atmospheric reaches a maximum compression pressure at point 2. At point 3 or near top dead center of the compression stroke, the compression ratio becomes equal to those obtained under full load and ignition occurs. Of particular relevance, is a pumping friction loss that will develop during the intake stroke as the throttle valve is proportionally suitably closed to impede normal air-flow into the cylinder as in 16. In particular, when the throttle is partially closed, a manifold vacuum develops as the intake pressure and the combustion chamber as in 20 pressure drop below atmospheric during the intake cycle. Consequentially, a detrimental pressure difference $\Delta P$ between opposing faces of the moving piston as in 18 in the cylinder as in 16 develops that is a pressure difference between the partial vacuum pressure in the combustion chamber as in 20 and an approximately normal atmospheric pressure in the crankcase 38 volume, and which is significantly present during part-load operation. This pressure differential $\Delta P$ is such that there is exerted onto the underside of the piston 18 a contributing vector force resisting the movement of the Otto intake cycle piston 18, or in other words a pumping resistance. Of note, intake cycle pumping-loss friction increases proportionally with the degree of restriction of air flow caused by the closure of the throttle valve and proportionally to the engine displacement. This differential pressure condition causes parasitic pumping-loss friction during an intake cycle that negatively affects specific fuel consumption and increases unwanted engine 12 anthropogenic emissions at part-load. It is thus an object of this invention to provide a system and method to neutralize this pressure differential $\Delta P$. Of note, at part-load pumping-loss friction results mainly from throttling of the Otto intake cycle as exhaust cycle pumping-loss friction is virtually non-existent at part-load.

Figure 6:
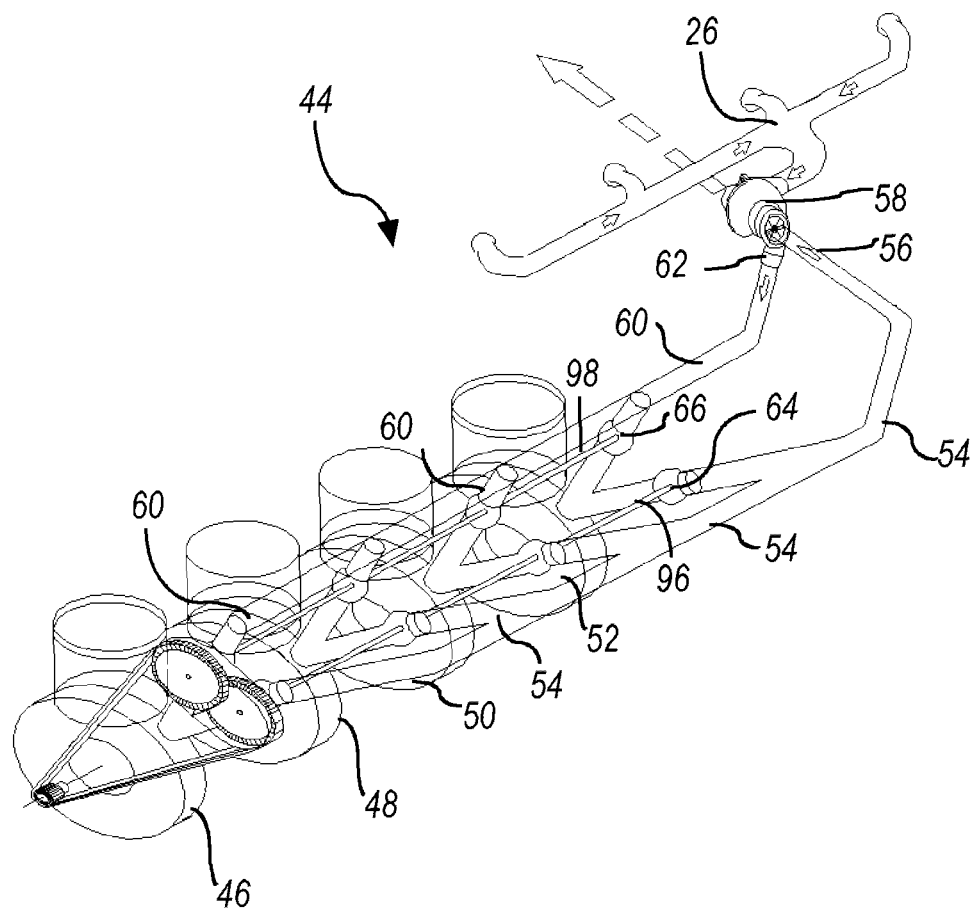
FIG. 6 is a perspective view of a multi-cylinder Otto Cycle internal combustion engine with a throttle-operated fuel system retrofitted with a closed-loop synchronized pneumatic coupling crankcase pressure reduction system in accordance with an illustrative embodiment of the present invention.

Referring now to FIG. 6, there is further provided a supplemental closed-loop synchronized pneumatic coupling crankcase pressure reduction system and method, generally referred to using the reference numeral 44 which may be illustratively retrofitted to an existing engine 12 without any alterations to the ideal robust stoichiometric operating mixtures of the engine's 12 intake cycle charges, or combustion process, or the like. Alternatively, the supplemental closed-loop synchronized pneumatic coupling crankcase pressure reduction system 44 may be integrated with the engine 12 to form the Light Turbo Compound engine variant 10, in a manner that is to be described herein below. The system 44 and method interacts with the engine 12 so as to preserve the engine's 12 instant seamless response and wide power torque curve by preserving the stable and dependable stoichiometric mixture combustion process of the engine 12 with the consequence of neutralizing pumping-loss friction. In this regard, the system 44 and method is supplemental to an existing engine 12 operation in that the interactions occur within the crankcase 38 and not within the combustion chamber as in 20. As a result of a reduction or elimination of pumping losses, an extension in the range capability of a vehicle employing the engine 12 is possible. For example, the present invention may be illustratively employed as a simple and robust fail-safe retrofit configuration to an existing aircraft engine, or as a complete turbo-compound engine variant substitute, for extending the flying range of the aircraft without requiring the alteration of its lean-out air-fuel combustion mixture, or in other terms, by allowing the aircraft engine to maintain its normal stable homogeneous stoichiometric air/fuel mixture.

Referring again to FIG. 3, in addition to FIG. 6, the supplemental closed-loop strategic pneumatic system 44 and method operates by neutralizing the pressure difference $\Delta P$ exerted on opposite faces of a piston as in 18 during an Otto intake cycle by means of varying the pressure cycles in the volume below the piston as in 18. In particular, the present invention isolates an individual cylinder-crankcase volume for each cylinder as in 16 to form a Variable Volume Individual Cylinder Crankcase (VVICC) volume and reduces the differential pressure exerted on the opposing face of a respective piston as in 18 performing its intake cycle by providing a temporary closely equivalent reduced pressure condition within each such cylinder-crankcase volume. There is therefore illustratively provided a supplemental closed-loop synchronized pneumatic coupling crankcase pressure reduction system 44 and method for an inline 4 cylinder engine comprising four individually partitioned cylinder-crankcases 46, 48, 50, 52 for isolating a volume below a piston as in 18 from the wet crankcase 38 volume, a plurality of evacuation conduits 54 serially connecting the plurality of individual-cylinder-crankcases 46, 48, 50, 52 to a low pressure input 56 of a pneumatic pump 58 for strategically displacing air housed in an individual-cylinder-crankcase 46, 48, 50, 52 to another individual-cylinder-crankcase 46, 48, 50, 52 via a plurality of serially connected expansion conduits 60 connected to a high pressure pump output 62 of the pneumatic pump 58. The cylinder-crankcases 46, 48, 50, 52 are thus hermetically isolated from other individual-cylinder-crankcases 46, 48, 50, 52 so as not to communicate directly therewith. In this sense, the volumes of the individual-cylinder-crankcases 46, 48, 50, 52 are connected in a closed-loop serial pneumatic relationship with a pump 58 and the volumes of other individual-cylinder-crankcases 46, 48, 50, 52, as the pneumatically coupled system does not communicate with ambient air surrounding the engine.

Referring still to FIG. 6, in addition to FIG. 3, there is further provided a plurality of control valves comprising synchronized evacuation control valves as in 64 for restricting or permitting air flow from an individual-cylinder-crankcase 46, 48, 50, 52 to be evacuated there from and synchronized expansion control valves as in 66 for restricting or permitting air to fill an individual-cylinder-crankcase 46, 48, 50, 52 in accordance with a strategic timing evacuation/filling sequence as will be described herein below. In general, the strategic opening and closing of the valves as in 64, 66 will determine which individual-cylinder-crankcase 46, 48, 50, 52 volumes will be displaced or filled via the pneumatic pump 58. In particular, the evacuation valve as in 64 of an individual-cylinder-crankcase 46, 48, 50, 52 undergoing an intake cycle will be open to allow the volume contained therein to be strategically displaced via the pump 58 and to the volume of a different individual-cylinder-crankcases 46, 48, 50, 52 undergoing an exhaust cycle and that comprises an expansion valve as in 66 that is similarly and simultaneously open. Consequentially, this displacement of air will neutralize the differential pressure $\Delta P$ condition by strategically exerting suitable equivalent under-pressure levels to the under face of a piston as in 18 in synchronicity with the Otto intake cycle of the engine 12 in order to counteract the temporary reduced pressure condition occurring simultaneously at the upper-face of the piston as in 18. The synchronized opening and closing of the control valves as in 64, 66 with the Otto intake cycle of the engine will be described herein below.

Figure 7:
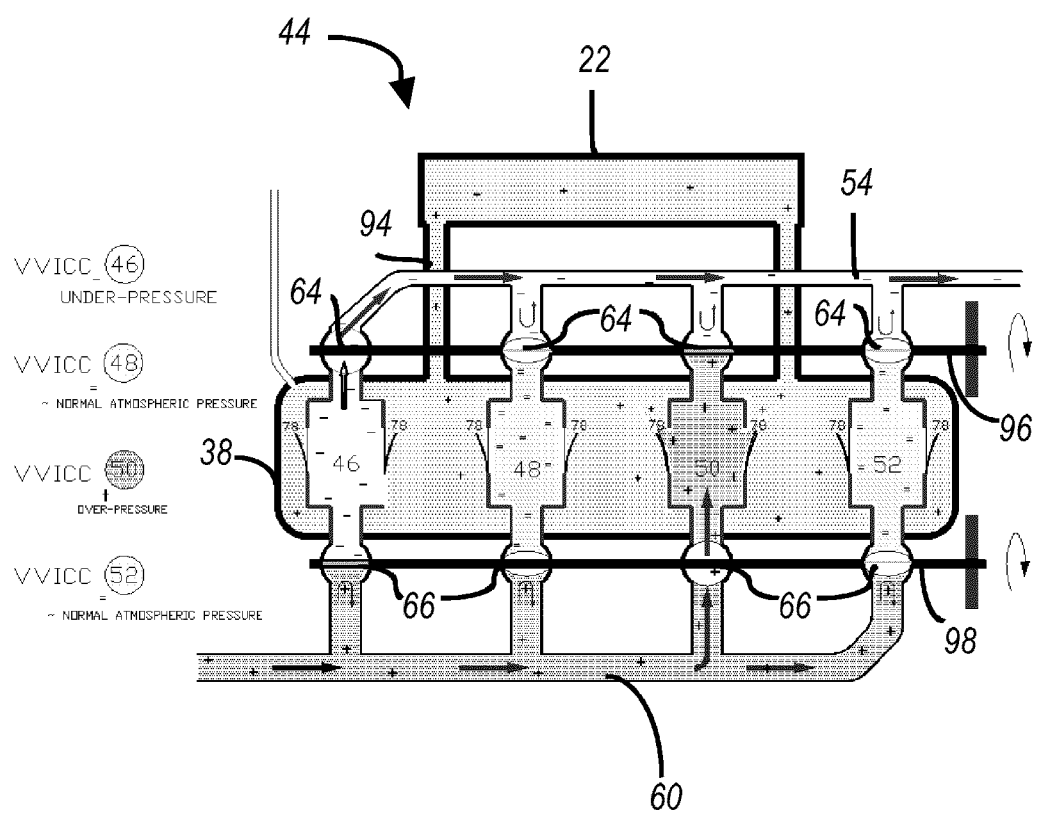
FIG. 7 is a top view of the closed-loop synchronized pneumatic coupling crankcase pressure reduction system of FIG. 6.

Now referring to FIG. 7 in addition to FIG. 6, the evacuation valve as in 64 of the individual-cylinder-crankcase 46 is opened during the intake stroke of that respective cylinder as in 16 to allow air to be evacuated there from and via the evacuation conduits 54 by a low pressure generated by the pump 58. The evacuated air is them pumped and displaced through the expansion conduits 60 wherein it is accepted into the individual-cylinder-crankcase whose expansion valve as in 66 is opened during its respective cylinder exhaust stroke. Of note, a normal volume reduction variation in the cylinder-crankcase 46 is progressively performed by the usual Otto intake cycle piston movement while a progressive increase of volume of the receiving cylinder-crankcase is being simultaneously performed by the piston movement during the Otto exhaust cycle of the receiving cylinder-crankcase. This normal Otto cycle on-going volume variation reduction further facilitates the evacuation and the charging work-load requirements of a nominally small capacity pump 58.

Still referring FIG. 7, in addition to FIG. 3, the individual-cylinder-crankcases 46, 48, 50, 52 form individual airtight dry sump partitions enclosing the cranks of a respective cylinder as in 16 to define an air Variable Volume Individual Cylinder Crankcase (VVICC) volume that is situated just below the piston as in 18. In particular, the individual-cylinder-crankcases 46, 48, 50, 52 form varying volumes defined between the engine block 14, the piston as in 18, and the main bearing caps 36, and a specially designed crankshaft bearing support girdle 68 that provides the smallest possible clearance space to prevent interference with the reciprocating motion of the piston as in 18. When the individual-cylinder-crankcases 46, 48, 50, 52 are not formed as part of the engine block 14 they may be illustratively formed by a retrofit of elements in a manner so as to provide clearance for a cylinder's crankshaft 34 and its crank throw including the connecting rod 32 and piston skirt (not shown) while including the crankshaft rotating counter weights as in 70. Consequentially, the crankshaft rotating or full circle narrow counter weights as in 70, as are normally used on two cycle multiple cylinder or V engines, are isolated from the wet crankcase 38 oil sump and do not affect oil splash occurring within the individual-cylinder-crankcases 46, 48, 50, 52 to thereby minimize possible oil foaming which may be inhaled by the pneumatic pump 58.

Still referring to FIG. 7, in addition to FIG. 3, the individual VVICC volumes of each individual-cylinder-crankcase 46, 48, 50, 52 are comprised only of constant air and are ventilated since they collect Otto combustion cycle $HO_2$ humidity content or blow-by escaped around the piston rings as in 24 as a result of the high pressure generated by the burning gasoline vapor in the combustion chamber as in 20. Additionally, the individual-cylinder-crankcases 46, 48, 50, 52 are themselves enclosed in the single crankcase, or the wet-sump crankcase 38 to form a uniquely partitioned twin-shell engine crankcase configuration which also collects oil from the individual cylinder's crankcase partitions 46, 48, 50, 52 as will be discussed herein below.

Figure 8:
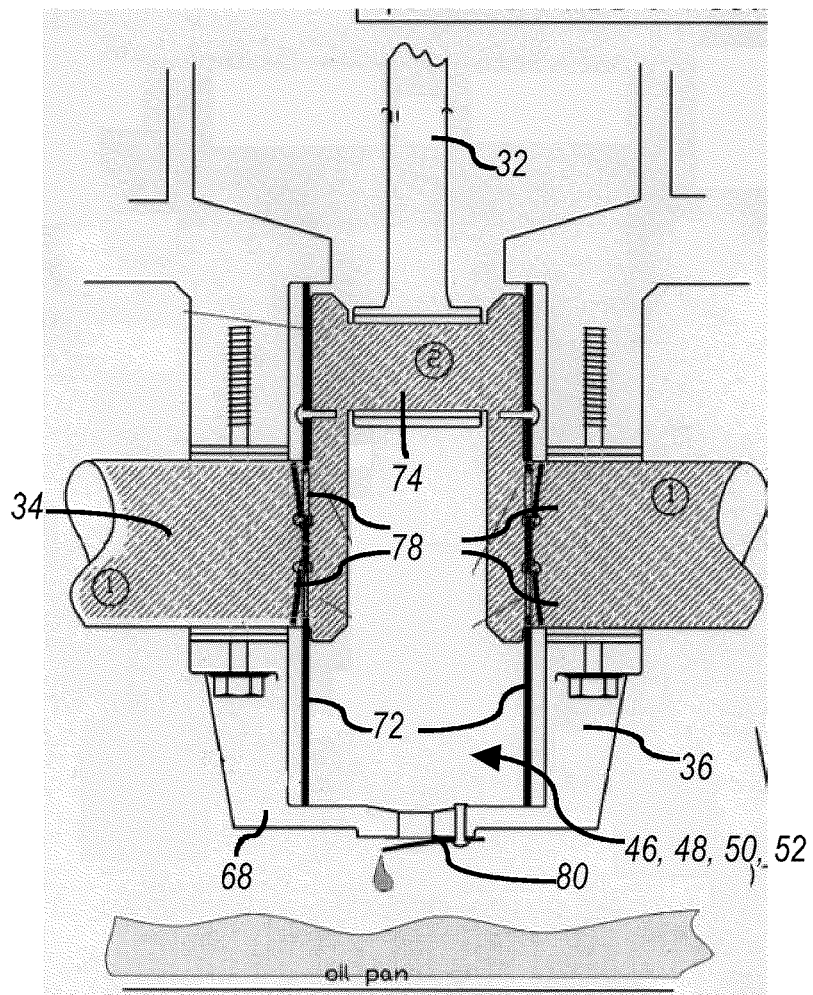
FIG. 8 is a cross-sectional view of an individual-cylinder-crankcase.
Figure 9:
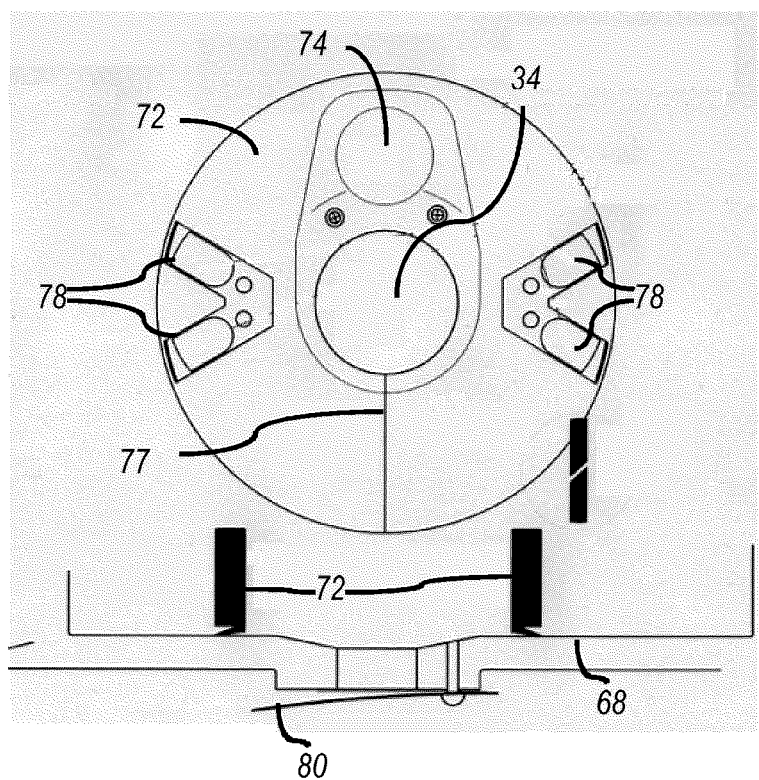
FIG. 9 is a front view of a partition disk.

Now referring to FIG. 8 and FIG. 9 in addition to FIG. 3, there is further provided light weight radially slit partition divider disks 72 as part of a retrofit configuration of an existing engine 12 which provide the lateral barriers between the main bearing caps 36 and the crankshaft bearing support girdle 68. In particular, the partition divider disks 72 are composed of a thin material and are intimately fitted loosely on the rotating crankshaft's 34 crankpin 74 on each side of the connecting rod 32 such that they loosely rotate along with the rotation of the crankshaft 34 within an inner groove 76 provided within the bearing support girdle 68. This inner grove 76 may comprise an outward V groove comprising a micro finish surface provided for the partition divider disks 72 to ride against which acts as a seal and which is lubricated by stray oil. Preferably, there may also be provided a narrow slit 77 in the partition divider disks 72 to facilitate a partition divider disk as in 72 insertion about a crankshaft 34 that is several times narrower than its height and which is positioned to line up with the crankpin 74 end orifice. A replaceable outward facing pointed lip insert ring can also be fitted onto the exterior edge of the partition divider disks 72. Still alternatively, if no outer edge lip seal is fitted to the partition discs 72, a groove in the bearing support girdle 68 just slightly wider than the partition divider disks 72 can act as labyrinth seal.

Still referring to FIG. 8 and FIG. 9, each radially slit partition divider disk 72 is provided with at least one or a plurality of outward flowing reed-valves 78 which act as an outward flowing check-valve to permit suitable dry-air evacuation and dry-air expansion of each separate individual-cylinder-crankcase 46, 48, 50, 52 to the larger air outer shell wet crankcase 38. In particular, these reed-valves 78 allow even slightly pressurized gases to overflow from each individual-cylinder-crankcases 46, 48, 50, 52 of a cylinder as in 16 performing its exhaust cycle to the available supplemental volume provided by the cylinder head valve cover and the wet crankcase 38, as is described herein below. The reed-valves 78 are provided by means of a suitable material as is normally used to manufacture reed-valves of the like, and are generally manufactured from phenolic or stainless steel. During the intake cycle of a cylinder as in 16, the individual-cylinder-crankcase 46, 48, 50, 52 volumes are subjected to timely suitable flexible under-pressure from the pump 58 and the reed-valves 78 are maintained closed by surrounding air pressure to facilitate the reduction of pressure from the VVICC volume in the individual-cylinder-crankcases 46, 48, 50, 52. Under increasing air-pressure provided for by the pump 58 during an individual-cylinder-crankcases 46, 48, 50, 52 expansion, the cylinder as in 16 crankcase partition disk's reed valves 78 open up to allow air flow out of those cylinder's individual-cylinder-crankcases 46, 48, 50, 52 and into the volume of the crankcase 38 and illustratively the cylinder head cover 22 volume, thereby reducing the workload of the pump 58.

Still referring to FIG. 8 and FIG. 9, there is further provided a low pressure threshold reed-valve 80 at the base of each individual-cylinder-crankcases 46, 48, 50, 52 in the crankshaft bearing support girdle 68 to allow slightly over pressure of transferred air gases as well as stray engine oil to overflow and to drop by the influence of air pressure and gravity into the large volume air wet sump crankcase 38 and the cylinder head valve cover enclosed volume. In the case of individual-cylinder-crankcases 46, 48, 50, 52 being formed from the engine block 14, only a low threshold reed-valves as in 80 is provided for allowing overpressure air to escape.

Now referring to FIG. 6 again, the pneumatic pump 58 is used for strategic pressure evacuation and displacement of the air volume of an individual-cylinder-crankcase 46, 48, 50, 52 by temporary providing and sustaining a suitable pressure difference between another unequal volume, such as a different individual-cylinder-crankcases 46, 48, 50, 52 and the wet sump crankcase 38. In particular, the pump 58 assists to partially evacuate and displace an individual-cylinder-crankcase 46, 48, 50, 52 pneumatic pressure during an Otto cycle piston downward movement of its increasingly smaller volume and assists in sustaining an under pressure therein in order to oppose the under-pressure being created simultaneously on the top face of the piston as in 18 in the cylinder as in 16 performing its intake cycle at part-load. For instance, the pump 58 is capable of creating and sustaining a pneumatic pressure difference between the pump's low pressure input 56 and the pump's high pressure output 62 all while using the lowest pumping energy requirement possible.

Referring to FIG. 6 and FIG. 7 again, the pump 58 is disposed in series and in a closed-loop relationship with two unequal volume air individual-cylinder-crankcases 46, 48, 50, 52 such that it can simultaneously and strategically supply a pulsating closed-loop pneumatic strategic air pressure variation to a specific small volume individual-cylinder-crankcase 46, 48, 50, 52 undergoing an Otto intake cycle and then expand the scavenged gas volume simultaneously, first into an individual-cylinder-crankcase 46, 48, 50, 52 of a cylinder undergoing simultaneously its Otto exhaust cycle and then into another supplemental secondary larger volume air chamber comprising the wet-sump crankcase 38 via either the low pressure threshold check-valve or reed-valve as in 80 or the outward flowing reed-valves 78 before the loop is closed and the process repeated. In particular, the warmer high pressure side of the gas evacuation pump 58, in particular at its high pressure output 62, is in a closed loop relation with the larger air volume expansion chamber, that is the wet crankcase 38 and the cylinder head cover 22, via an individual-cylinder-crankcase 46, 48, 50, 52 and the wet sump crankcase 38 which is approximately slightly higher than atmospheric pressure while the colder low pressure input 56 of the pump 58 is in series with the small volumes of the individual-cylinder-crankcases 46, 48, 50, 52 of a cylinder as in 16 performing its Otto intake cycle which comprises an pressure of approximate 0.3 bar.

Now referring to FIG. 6 again, the pneumatic under-pressure pump 58 is preferably a dynamic rotary vane pressure pump, or a small capacity low-pressure inverted-function turbocharger employing its compressor energized by the turbine as a low energy draw pneumatic scavenging pump, or also known as a Turboscavenger™, instead of the usual turbocharger configuration used for increasing air pressure. The inverted function turbocharger 58, in accordance with the illustrated embodiment of the present invention, has its exhaust gas flow volume through its turbine that can be controlled and regulated by a waste-gate or a Y-by-pass valve (not shown) to insure that the inverted function turbocharger 58 is operated so that the turbo is near a choke borderline condition. Of note, a choke condition of the inverted function turbocharger 58 will prevent a freezing of any moisture contained in the air. A proper sizing the inverted function turbocharger 58, will prevent the compressor from operating past the choke line. The inverted function turbocharger 58 is further provided with a set of reed valves 59 positioned at the compressor input and the compressor output of the inverted function turbocharger 58 and since during each successive cylinder intake cycles, the reed valves 59 remain open for allowing normal continuous unhampered closed-loop directional air flow. The reed valves 59 close when the inverted turbocharger pump 58 begins to choke at a point where normal air flow stops or reverses. As the choking of the inverted turbocharger pump 58 is temporary, the inverted function turbocharger 58 may thus operate in a pulsating manner and the reed valves 59 prevent a pressure reversal or a reverse air flow during the period when the inverted turbocharger pump 58 is choked. Additionally, as the inverted turbocharger pump 58 may remain in a choked state for a short period of time before the current evacuation ends, and a new evacuation cycle of a different VVICC is initiated, the temporary beneficial temperature rise of the ambient air trapped within close vicinity of the turbocharger compressor and air inlet of the inverted turbocharger pump 58 prevents the moisture contained in the blow-by present in the VVICC to freeze. However, the inverted turbocharger pump 58 should not be allowed to operate deep into choke for a prolonged period, as the rotational speed of the compressor increases dramatically while the compressor efficiency plunges and the scavenging work of the inverted turbocharger pump 58 is reduced, very high compressor outlet temperatures can be reached, and the durability of the inverted turbocharger pump 58 can be compromised. Of note, in accordance with the illustrative embodiment of the present invention, only the scavenging function of the inverted turbocharger pump 58 is of importance and not its charging function. Additionally, the inverted turbocharger pump 58 is mounted at the outlet to the exhaust manifold 26 so that it receives exhaust gas from exhaust ports 30 and is preferably driven by a sufficiently large enough capacity rotary exhaust turbine. The scavenging task for the inverted turbocharger pump 58 is made easier for achieving the required level of evacuation and filling in selected cylinder-crankcases 46, 48, 50, 52 by taking advantage of the possibility provided by a multiple cylinder engine configuration where simultaneous dynamic-volume-reductions of the individual-individual-cylinder-crankcases 46, 48, 50, 52 below the moving piston as in 18 due to its movement during the Otto intake cycle and by the simultaneous dynamic-volume-increment of another enclosed cylinder's crankcase 46, 48, 50, 52 due to Otto exhaust cycle of its cylinder as in 16. The inverted turbocharger pump 58 may optionally be temporarily assisted by an electrically assisted exhaust turbine or may benefit from the use a sufficiently large enough variable vane type inverted function turbo-pump mounted at the outlet to the exhaust manifold 26. Of note, a sufficiently sized inverted turbocharger pump 58 is used to promote a beneficial moderate back-pressure by increasing residual exhaust retention that will partly dilute the next intake charge in the cylinder as in 16 performing its exhaust cycle and will allow a wider throttle opening and contribute to further reduce intake pumping-loss. Additionally, the opening of the Y junction exhaust gas bypass valve linked to the exhaust port as in 30 can instantly relieve back-pressure upon command.

Still referring to FIG. 6, in order for the scavenging function of the inverted turbocharger pump 58 to be effective at low engine power settings that occurs at lower part-load or near idle operation, and during which exhaust gas energy is low, the inverted turbocharger pump 58 is just sufficiently sized to maximize the under-pressure at the low pressure input 56 so that the differential pressure exerted on opposite faces of the piston as in 18 while the respective cylinder as in 16 is performing its intake cycle is effectively neutralized. Accordingly, this requires an overall pumping capacity to be approximately equivalent to the algebraic sum of opposing pressures on opposing faces of the piston as in 18. The total Overall Workload pressure (OWp) of the inverted turbocharger pump 58 must include the existing pressure value of the under-pressure in the intake manifold, or the pressure on one face of the piston as in 18, that can decrease to about one third of normal atmospheric pressure, typically 33 kiloPascals (kPa) Neutralizing Under Pressure (NEP). This negative pressure value must be algebraically added to the positive existing Near Ambient Normal Atmospheric Pressure (NAAP) in the crankcase 38 of approximately 100 kPa. To achieve this, the total OWP of the inverted turbocharger pump 58 includes the value of the tolerated gas Expanded Pressure (EP) expanding in the larger volume chamber, or the wet crankcase 38, with the algebraic sum of the under-pressure exerted onto the underside of the piston as in 18 of either sides of said inverted turbocharger pump 58, for instance:

(NAAP:1.0)+(NEP:1.0−0.66)=(OWP)1.33 kPa

Of note, over pressure overflow, that is pressure above the static wet crankcase 38 pressure will overflow through the low threshold check low threshold reed-valve as in 80 and into the larger volume of the wet crankcase 38.

Still referring to FIG. 6, due to the normally low exhaust gas volume generation and resulting low energy level output of the engine 12 operating at low load, the flow capacity of the pneumatic pump 58 must be optimized for a multiple cylinder engine 12 with a throttled utilization at part-load so that the under-pressure generated should be sufficient to effectively neutralize the differential pressure exerted on opposite faces of the piston as in 18 while the cylinder as in 16 is performing its intake cycle. Of note, it is important to use a gas medium that contains the least proportion of water vapors or preferably uses only dry-air.

Still referring to FIG. 6, since the inverted turbocharger pump 58 of the present invention is mostly operated and useful under low and moderate engine power conditions, that is when the exhaust gas flow is low or moderate, system considerations must be made for an exhaust gas bypass-valve, a waste gate linkage, or a variable vane configuration (not shown) to be provided for suitably reducing the exhaust gas flow volume to the turbine of the inverted turbocharger pump 58. This may occur at a mid-throttled position wherein exhaust gas energy level can provide excessive exhaust gas volume and energy to feed the nominally small flow capacity inverted turbocharger pump 58. Therefore, there is provided at the outlet of the exhaust manifold 26 a routing Y exhaust flow bypass valve that can either direct all incoming exhaust gasses through the small inverted turbocharger pump 58 or progressively dump all incoming exhaust gas flow to the engine tail pipe outlet. Alternatively, the exhaust gas flow may be illustratively directed to a second normal turbocharger (not shown) which begins to spin as the gas is bypassed from the inverted turbocharger pump 58 at part-load so that it may operate at middle and full loads to provide the advantages to the engine 12 as are normally associated with a turbocharger. Such a bypass valve will reduce impeller (not shown) rotational speeds of the inverted turbocharger pump 58 as well as exhaust cycle pumping work due to unnecessarily high exhaust back-pressure at higher engine loads as the impeller of the inverted turbocharger pump 58 approaches the overspeed-limit point, at which point surging may occur. In particular, there is therefore provided a Y configuration by-pass valve, or bypass linkage (not shown) which is actuated when the throttle valve approaches the point of being fully open thereby reducing substantially the turbine and the pump compressor rotational speed.

Figure 10:
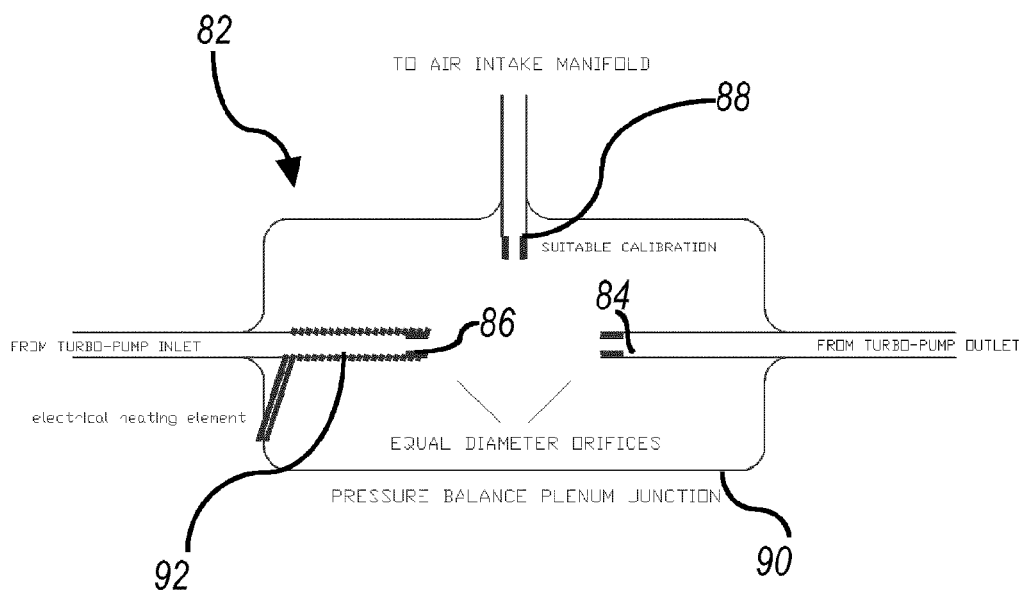
FIG. 10 is a cross-sectional view of a balanced pressure plenum junction regulator.

Now referring to FIG. 10, there is further provided a balanced pressure plenum junction regulator 82, similar construction to that of a Positive Crankcase Ventilation (PCV) valve, in a parallel pneumatic connection between the low pressure input 56 and the high pressure output 62 of the pump 58 and further connected to the air intake manifold to alleviate any gas pressure increases and vapor within the closed-loop system due to volume increases caused by blow-by gasses and the like that has entered into individual-cylinder-crankcases 46, 48, 50, 52. In particular, two equal diameter orifices comprising a high pressure inlet orifice 84 connected to the high pressure pump output 62 and a low pressure inlet orifice 86 connected to the low pressure pump input 56 in the plenum 82 are provided from the evacuation conduit 54 and the expansion conduits 60 connected to the low pressure input 56 and the high pressure output 62, respectively, wherein overpressure air may escape from the closed loop system in a controlled manner by a suitably calibrated orifice 88 leading to the air intake manifold. To ensure that vapor from blow-by contained in the air does not solidify within the plenum 82 volume, and in particular at the output of the high pressure inlet orifice 84 connected to the evacuation conduit 54 of the low pressure input 56 of the pump 58, a balanced pressure plenum junction regulator body 90 is illustratively manufactured from suitable heat conductive metal such as copper or brass to conduct heat from a turbocharger exhaust collector flange or thermal conductive bracket into contact with the balanced pressure plenum junction regulator 82 for warming the regulator body 90 to prevent ice formation at the low-pressure inlet orifice 86. Alternatively, there may be provided a balanced pressure plenum junction regulator body 90 comprising non-heat conductive material and an electrical heating element 92 to melt any buildup of ice at the low pressure inlet orifice 86.

Referring again to FIG. 7, there is provided a significantly larger supplemental expansion volume chamber wet-sump crankcase 38 (oil-pan) that is strategically connected in a series relationship with the smaller individual-cylinder-crankcases 46, 48, 50, 52 VVICC volumes to reduce the total under-pressure pumping workload of the pneumatic pump 58 and allows to easily reduce the pumping requirements for achieving a suitable under-pressure level of the smaller individual-cylinder-crankcases 46, 48, 50, 52, for instance during the opening of the valves 64, 66 over 45 degrees rotation thereof per Otto cycle when the present invention is illustratively applied to an inline 4 cylinder engine. In particular, there is provided a supplemental expansion volume chamber comprising the wet-sump crankcase 38 volume for all cylinders as in 16 in communication with the engine cylinder head cover 22 via a communication passage 94 connecting the outer larger shell wet-sump crankcase 38 to a volume of a cylinder head cover 22 wet area, such that the volume within the wet-sump crankcase 38 is able to freely communicate therewith. The cylinder head cover volume provides a supplemental volume and together with the wet-sump crankcase 38 provide a collective overall larger expansion volume. The expansion volume pressure should remain close to normal atmospheric pressure as possible and is submitted to a very moderate air pressure increase at the normal operating temperature of the crankcase 38 for only allowing minimal pressure increases as per Boyle & Mariotte's law. Generally, the expansion volume is maintained near normal atmospheric pressure level by the adapted positive crankcase ventilation system via the balanced pressure plenum junction regulator 82. Of note, for improved pump 58 scavenging efficiency, the volumes of the individual-cylinder-crankcases 46, 48, 50, 52 (dry-sump) should be as small as possible while the overall volume of the effective total expansion volume in the wet-sump crankcase 38 should be maximized to be as large as possible. This volumetric relationship can be achieved as part of a compact multiple cylinder engine configuration comprising at least three cylinders as in 16. Of note, a minimal pressure raising task should sought and achieved in an air environment, so while only minimally increasing the pressure in the expansion volume chamber. To strictly ensure that there is no emission increase, the expanded air volume's pressure should remain as low and as close to normal atmospheric pressure as possible.

Figure 11:
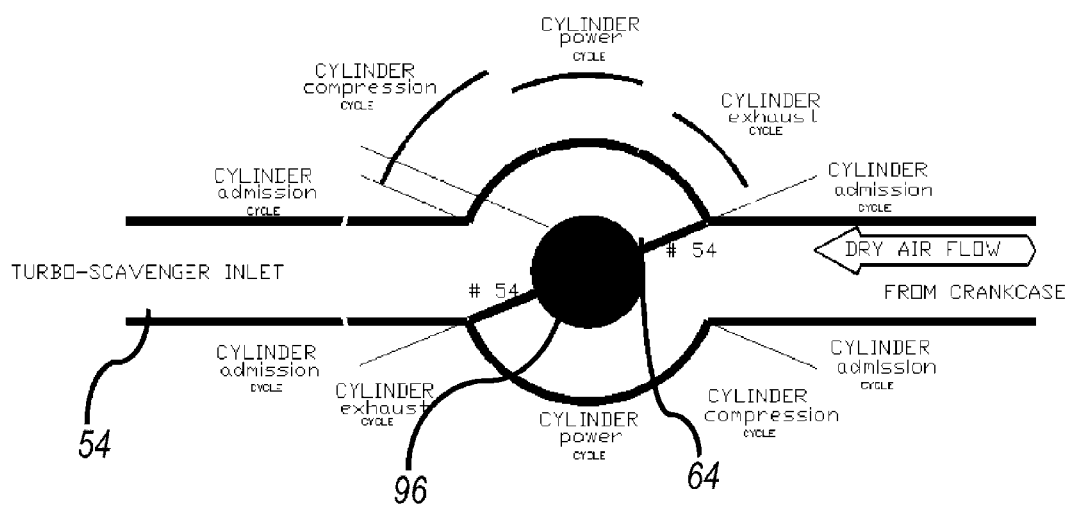
FIG. 11 is a side view of an evacuation valve illustrating its open and closed positions in accordance with an illustrative embodiment of the present invention.

Now referring to FIG. 11 in addition to FIG. 6 and FIG. 7, the plurality of control valves as in 64, 66 control air flow to and from an individual-cylinder-crankcases 46, 48, 50, 52 for evacuation or filling of a given individual-cylinder-crankcase 46, 48, 50, 52 in accordance with a strategic timing sequence, for instance during 45 degrees per Otto cycle in an inline 4 cylinder engine. In particular, each said individual-cylinder-crankcase 46, 48, 50, 52 inlet and outlet access conduit is controlled by a pair of low friction rotary control valves as in 64, 66 that are synchronized via their specific staggered connection to a first common rotating shaft 96 for controlling the rotation timings of the evacuation valves 64 and a second common rotating shaft 98 for controlling the rotation of the expansion valves 66, a rotation of which is a quarter of the crankshaft 34 Rotations-Per-Minute (RPM) in the case of an inline 4 cylinder engine 12. The first 96 and second 98 common rotating shafts are illustratively connected to a linkage which may be connected to the crankshaft 34 either directly, via a gear mechanism, or indirectly via a timing belt or timing chain in a manner such that the rotation of the linkage causes a rotation of the valves as in 64, 66. In particular the timing of the opening and closing of the control valves as in 64, 66 is such so as to coincide with the piston displacement in the cylinder as in 16 during the Otto intake and exhaust cycles. In particular, the control valves as in 64, 66 are illustratively shown to be mechanically synchronized to the engine crankshaft 34 to strategically and timely open or close in synchronization with the engine's firing order. The control evacuation valves as in 64 are thus timed to open during the intake stroke of each cylinder as in 16 to allow the pump 58 to produce a temporary reduced pressure condition in each isolated individual-cylinder-crankcase 46, 48, 50, 52 volume. During the balance of each cylinder's 16 cycles except for the intake cycle, each of the other associated cylinder-crankcase's control evacuation valves as in 64 are closed. During the intake Otto cycle, all crankcase evacuation valves as in 64 are closed except for the one crankcase evacuation valve 64 associated with the cylinder performing its intake cycle. Simultaneously, during all the cylinder's intake strokes, most expansion valves as in 66 between the high pressure 62 side of the gas evacuation pump 58 and the individual crankcase volumes for each cylinder as in 16 are closed except for the one for the cylinder performing its exhaust cycle.

Figure 12:
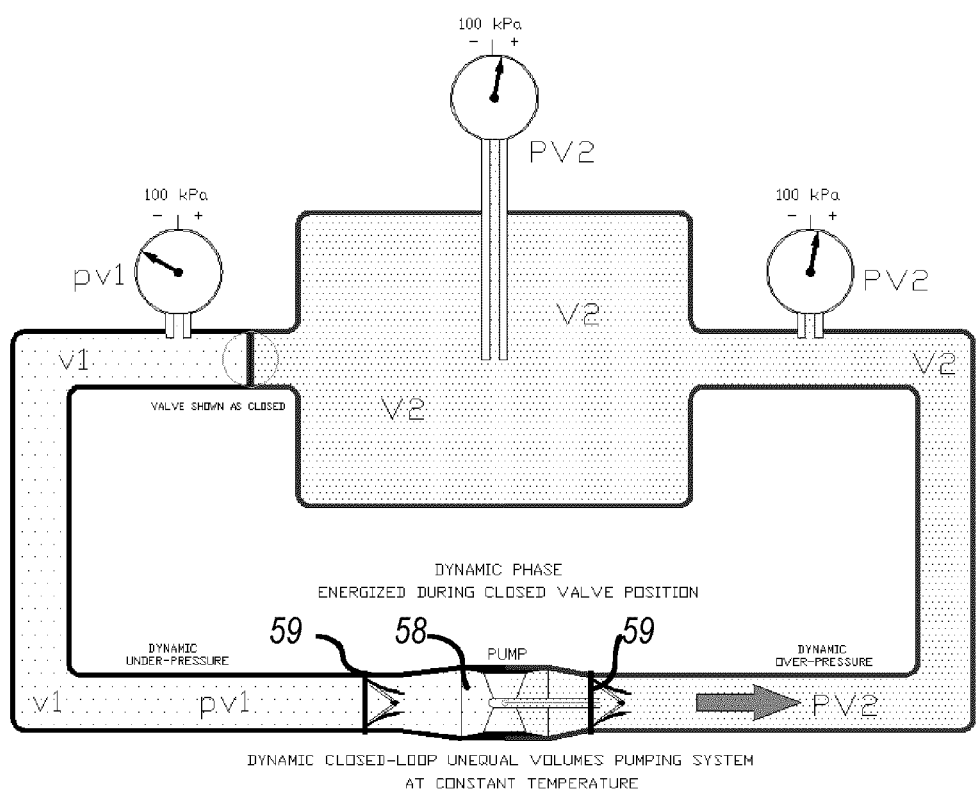
FIG. 12 is a schematic view of a substantially unequal volume closed-loop pumping system responding to Boyle & Mariotte law as applied to a synchronized pneumatic coupling crankcase pressure reduction system in accordance with an illustrative embodiment of the present invention illustrating the various pressures within a closed-loop system.
Figure 13:
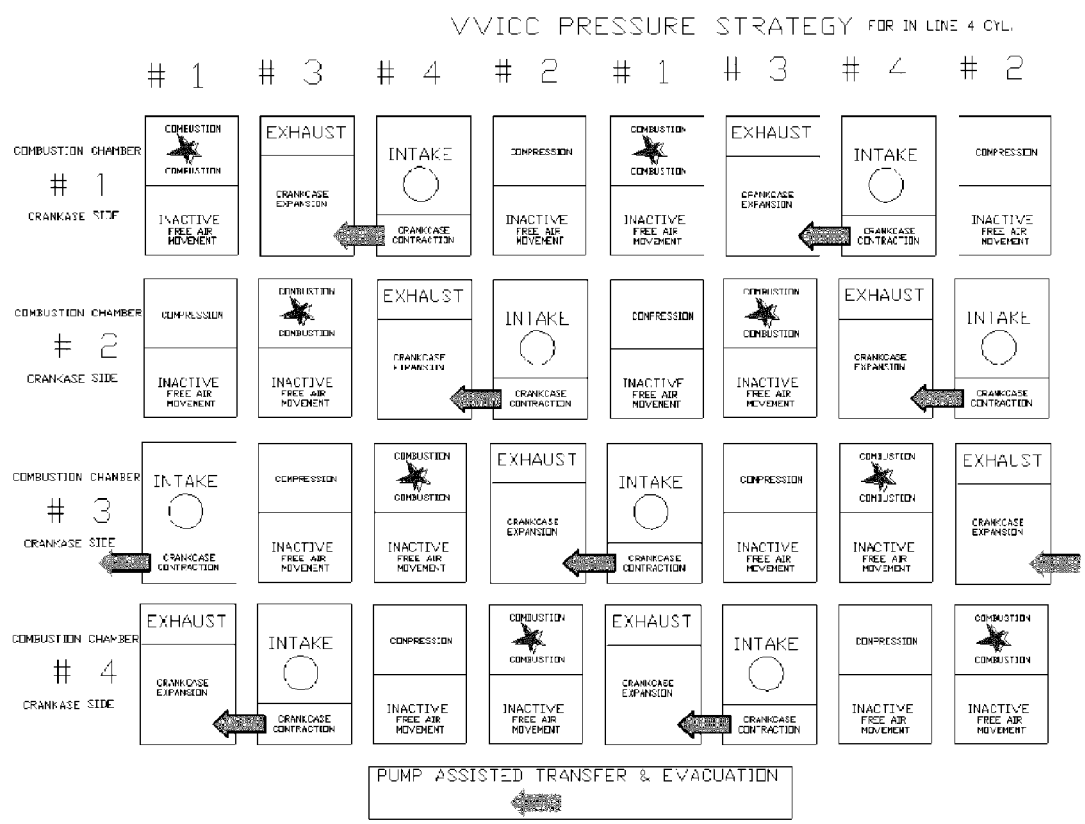
FIG. 13 is a strategic crankcase pressure strategy in accordance with an illustrative embodiment of the present invention.

Now referring to FIG. 12 and FIG. 13, in addition to FIG. 6, the operation of the closed-loop synchronized pneumatic coupling crankcase pressure reduction system 44 and method is described. Generally, the new supplemental closed-loop strategic pneumatic evacuation cycle method exposes the underside of a piston as in 18 facing toward the crankcase 38 with an equal under-pressure provided by a suitably controlled and reversed-configured calibrated pump 58 used to provide suitable under-pressure for matching the under-pressure exerted onto the piston's 18 upper-surface facing toward the combustion chamber 20 in order to neutralize the differential pressure exerted on opposite faces of the piston as in 18 that exists during the Otto intake cycle of a throttled spark-ignited S.I. Otto internal combustion engine 12 during part-load engine operation. During the engine 12 operation, pressure levels within the individual cylinder's crankcases 46, 48, 50, 52 are strategically and successively temporary lowered by the scavenging work provided by the pump 58. This reduction of the pressure level occurs simultaneously with an individual cylinder's crankcase 46, 48, 50, 52 normal volume reduction which occurs during the Otto intake cycle piston's travel strokes. The volume of an individual cylinder's crankcases 46, 48, 50, 52 is evacuated and is displaced with the assistance of the pump 58 through the evacuation conduits 54 to conveniently fill individual cylinder's crankcases 46, 48, 50, 52 that are also conveniently simultaneously expanding due to piston's 18 movements during an Otto exhaust stroke. The out-flowing reed valve 78 in an individual cylinder's crankcases 46, 48, 50, 52 that is being filled allows for evacuated gas to overflow into a supplemental enclosed large volume chamber in the case of excessive volume and pressure provided by the pump 58 to reduce the pump's work-load and allow the pump 58 to lower the ambient gas pressure of an evacuated individual cylinder's crankcases 46, 48, 50, 52 to an even lower level. During all the other cylinder Otto cycle stages, except for the exhaust cycle of a respective cylinder as in 16, individual cylinder's crankcases 46, 48, 50, 52 are not submitted to charging pressures as the expansion valves as in 66 remain closed. However, as an exhaust cycle starts for a given cylinder as in 16, its expansion valve as in 66 opens to allow high pressure generated by the pump 58 to build-up. During the other cylinder stages of their other respective Otto cycles when their associated piston as in 18 are not performing an Otto exhaust cycle, the expansion valves as in 66 are closed so as to restrict the flow of gas to within its respective individual cylinder's crankcase 46, 48, 50, 52 volume.

Referring again to FIG. 12, in accordance with the illustrated present invention, the strategic crankcase pressure during the Otto intake cycle comprises various levels of under-pressure ranging from approximately 33 kPa to 99 kPa. The strategic crankcase pressure during the Otto compression cycle, is at normal atmospheric pressure. The strategic crankcase pressure during the Otto exhaust cycle, becomes slightly above normal atmospheric pressure ranging. The strategic crankcase pressure during the Otto combustion cycle remains at approximately normal atmospheric pressure.

The Light Turbo Compound engine variant 10 according to the illustrative embodiment of the present invention simultaneously provides a method for improving emission reduction, cost effectiveness, and fuel efficiency by neutralizing the differential pressure $\Delta P$ which causes the parasitic pumping-loss friction in a throttled S.I. Otto cycle internal combustion engine 12 operating at part load in addition to additional advantages that are now described. For instance, an engine 12 employing a closed-loop synchronized pneumatic coupling crankcase pressure reduction system 44 and method results in a decrease in its specific fuel consumption and anthropogenic emissions, such as Hydro Carbon (HC) raw emission, by eliminating the pressure differentials that contribute to reverse blow-by. Furthermore, the present invention provides a method for an internal Exhaust Gas Recirculation (EGR) effect resulting from partially evacuated exhaust gases caused by exhaust valve back pressure from the inverted turbo-charger pump 58 in each cylinder as in 16 which dilutes fresh air-fuel mixture intake charge resulting in a reduction in combustion temperature. Additionally, a diluted fresh air-fuel mixture intake charge requires a larger throttle opening in order to maintain equivalent output power which also provides a method to aid to curb $NO_x$ emissions as engine load is increased to full engine load wherein the throttle is fully open as it is generally known that a larger throttle 32 opening results in a greater reduction of throttled induced pumping losses. Even further, there will be a reduction in $CO_2$ emissions since a reduction in the differential pressure $\Delta P$ results in a reduction of specific fuel consumption which is directly proportional to reduction in $CO_2$ emissions and method can occur without further altering any desirable properties of the robust homogeneous stoichiometric charge of the throttled SI Otto cycle internal combustion engine.

Additionally, the Light Turbo Compound engine variant system 10 and method is supplemental to Otto cycles and do not alter in anyway the existing operation of an Otto Cycle internal combustion engine. Accordingly, the stability of the usual robust fail-safe stable intake mixture charge and the associated robust combustion process of the spark ignited homogeneous charge Otto Cycle internal combustion engine 12 are preserved. Additionally, the present invention is able to preserve the cost effective and lightweight source of vacuum pressure for engine accessories such as power steering, power brakes of personal transportation vehicles. Since the pneumatic coupling turbo-compound system of the present invention involves a low-friction supplemental non-critical system, it provides a fail-safe function that occurs remotely from the combustion chamber and from the stable robust Otto Cycle combustion process of an SI throttled internal combustion engine, the present invention is ideally suited as a safe method for application in light personal aircraft engines where an unaltered homogeneous stoichiometric charge air/fuel mixture at part-load operation is an essential safety criteria. Still additionally, the present invention also safely extends the useful range of an aircraft cruising at a reduced power economy setting without having to rely on the interference of a pilot in the adjustment of critical sensitive air-fuel mixture controls leading to unsafe altered combustion conditions that can possibly adversely interfere with engine operation and engine durability. Even further, the present invention preserves the mandatory blow-by containment within the crankcase for positive crankcase ventilation in a compact limited internal overall volume.

Still additionally, the Light Turbo Compound engine variant 10 of the present invention provides a simple and cost effective system and method to improve a throttled Otto Cycle internal combustion engine 12 comprising components which are simple, robust, passive, and non-critical, and having low friction components while providing part-load fuel efficiency that is normally only available from costlier, more complex, and fail-deadly inter-dependant components used in direct fuel injection system engines or in electric valve actuation of cam-less engines. Thus, the present invention provides a system and method for using existing component capability to cost effectively provide a lightweight and simple fail-safe system able to be retrofitted to an existing Otto cycle engine 12 in order to reduce pumping-loss friction normally associated with costlier direct fuel injection systems.

Still additionally, the dual dry-wet-sump configuration crankcase of the Light Turbo Compound engine variant 10 as described herein above prevents oil carry-over from individual cylinder enclosed small volume dry-sump crankcases 46, 48, 50, 52 during the Otto intake cycle and helps provide a method to prevent windage friction normally associated with a wet-sump engine which tends to cause parasitic drag on the crankshaft 34 caused by oil splashing out of the sump at high Rotations-Per-Minute (RPM). This advantage is due to the shielding properties of the unique crankcase configuration of the individual cylinder enclosed small volume dry-sump crankcases 46, 48, 50, 52. The girdle 68 is the lower half of the VVICC shell and also prevents the agitated air contained in the crankcases 46, 48, 50, 52 to stir-up and whip the oil of the wet crankcase and increase friction.

Still additionally, since throttle fuel controlled system are widely used due to their cost effectiveness and are less susceptible to critical to failures, they are often used for controlling alternate fuel engines such as gaseous state fuels, namely Compressed Natural Gas (CNG) or Liquefied Natural Gas (LNG). It is generally known that while engines using CNG fuel produce cleaner anthropogenic emissions, even at part-load operation, and one day may be prevalent in urban areas, the specific heat content of such fuels are substantially lower than gasoline and thereby reduce the operational range of a CNG vehicle comprising a limited fuel tank capacity in comparison with a gasoline counterpart. Since the method of the present invention neutralizes or substantially reduces pumping-loss friction induced by the throttle at part-load it can partially and advantageously compensate for the lower specific heat of alternative fuels, and therefore improve a vehicle's range operating at part-load.

Still additionally, the Light Turbo Compound engine variant 10 of the present invention reduces the throttle induced pumping loss that is proportional to displacement of the engine 12, thereby allowing the possibility to conveniently and efficiently employ larger displacement engines while curbing the combustion pressure strains and shocks by providing a system and method that can curb $NO_x$ emission and provides a system and method to further facilitate the earlier implementation of thermally useful but mechanically brittle ceramic materials which can reduce radiant heat loss and reduce the overall weight of the cooling system of an engine 12.

Still additionally, the Light Turbo Compound engine variant 10 of the present invention further allows the use of a piston as in 18 comprising rings of lighter ring tension resulting in lighter ring-pack dynamic friction. Consequentially, a reduction in raw emission resulting from a method to control usual reverse blow-by, as well as a reduction in hydro carbon (HC) emission resulting from ring wear, which would normally require a higher radial tension ring to counteract the effects of a normal detrimental differential pressure ΔP exerted at opposite ends of a piston in throttled Otto cycle internal combustion engine at part-load as well as HC raw emission due to ring-cylinder normal wear. Additionally, the Light Turbo Compound engine variant 10 allows for a reduction in the ring-pack tension friction to further reduce internal combustion engine mechanical friction forces from the rings acting on the side walls of the cylinder.

While this invention has been described with reference to the illustrative embodiments, this description is not intended to be construed to a limiting sense. Various modifications or combinations of the illustrative embodiment of the invention will be apparent to persons skilled in the art upon reference to the description. It is therefore intended that the described invention encompass any such modifications or embodiments.

The invention claimed is:

1. An Otto cycle internal combustion engine (12) comprising:
   a pump (58) comprising an input (56) and an output (62);
   at least two enclosed and individually partitioned dry-sump cylinder crankcases (46, 48, 50, 52) in pneumatic closed loop connection, each defining an air volume between an underside of a piston (18), a wall of a cylinder (16), and a crankshaft bearing support girdle (68) separating said dry-sump cylinder crankcases (46, 48, 50, 52) from a wet-sump crankcase (38);
   at least two evacuation conduits (54) in pneumatic series connection with said individually partitioned cylinder crankcases (46, 48, 50, 52) and with said input (56);
   at least two expansion conduits (60) in pneumatic series connection with said individually partitioned cylinder crankcases (46, 48, 50, 52) and with said output (62);
   at least two synchronized evacuation valves (64) disposed between said individually partitioned cylinder crankcases (46, 48, 50, 52) and said evacuation conduits (54), said evacuation valves (64) being operable between an open position for allowing air flow from said individually partitioned cylinder crankcases (46, 48, 50, 52) and into said evacuation conduits (54) and a closed position for restricting air flow from said individually partitioned cylinder crankcases (46, 48, 50, 52) and into said evacuation conduits (54); and
   at least two synchronized expansion valves (66) disposed between said individually partitioned cylinder crankcases (46, 48, 50, 52) and said expansion conduits (60), said expansion valves (66) being operable between an open position for allowing air flow into said individually partitioned cylinder crankcases (46, 48, 50, 52) and a closed position for restricting air flow into said individually partitioned cylinder crankcases (46, 48, 50, 52);
   wherein said air volume of the individually partitioned cylinder crankcase (46) is evacuated by said pump (58) when said evacuation valve (64) of said individually partitioned cylinder crankcase (46) undergoing an intake stroke is open and displaced to the air volume of the individually partitioned cylinder crankcase undergoing an exhaust stroke when said expansion valve (66) of said individually partitioned cylinder crankcase undergoing the exhaust stroke (50) is simultaneously open.

2. The internal combustion engine of claim 1, wherein said evacuation valves (64) and expansion valves (66) are rotating throttle valves.

3. The internal combustion engine of claim 2, wherein said evacuation valves (64) are mounted to a first rotating shaft (96) wherein at least one evacuation valve (64) is operable at said open position over a first range of angular rotation of said first rotating shaft (96) and at least one evacuation valve (64) is operable at said closed position over a second range of angular rotation of said first rotating shaft (96).

4. The internal combustion engine of claim 2, wherein said expansion valves (66) are mounted to a second rotating shaft (98) wherein at least one expansion valve (66) is operable at said open position over a first range of angular rotation of said second rotating shaft (98) and at least one expansion valve (66) is operable at said closed position over a second range of angular rotation of said second rotating shaft (98).

5. The internal combustion engine of claim 3, wherein said first rotating shaft (96) is connected via a linkage to the crankshaft (34) to impart a rotation of said first rotating shaft (96).

6. The internal combustion engine of claim 4, wherein said second rotating shaft (98) is connected via a linkage to the crankshaft (34) to impart a rotation of said second rotating shaft (98).

7. The internal combustion engine of claim 1, wherein said individually partitioned cylinder crankcases (46, 48, 50, 52)

comprise a plurality of low pressure threshold reed-valves (80) which open to allow an overpressure of said air volume within said individually partitioned cylinder crankcases (46, 48, 50, 52) to expand into a volume of said wet-sump crankcase (38).

8. The internal combustion engine of claim 7, wherein said plurality of low pressure threshold reed-valves (80) are located at a base of each individually partitioned cylinder crankcases (46, 48, 50, 52) to allow an amount of stray oil and said overpressure of said air volume to escape into said wet-sump crankcase (38) volume.

9. The internal combustion engine of claim 8, wherein said wet crankcase (38) volume is pneumatically connected to a secondary volume to form a large supplemental expansion volume.

10. The internal combustion engine of claim 9, wherein said secondary volume is a cylinder head cover (22) volume.

11. The internal combustion engine of claim 10, wherein said supplemental expansion volume is larger than said air volumes.

12. The internal combustion engine of claim 11, wherein said supplemental expansion volume at least twice as large as said air volumes.

13. The internal combustion engine of claim 1, wherein said pump (58) is an inverted function turbocharger comprising a turbine input for receiving an exhaust flow from the internal combustion engine to induce a rotation of a turbine connected to a common shaft and a compressor connected to said common shaft for creating a low pressure state at a low pressure compressor input (56) and a high pressure state at a high pressure compressor output (62).

14. The internal combustion engine of claim 13, wherein said inverted function turbocharger is optimized to provide a maximum pressure differential between said low pressure compressor input (56) and said high pressure compressor output (62) at a part-load operation of the engine (12).

15. The internal combustion engine of claim 14, further comprising a first check-valve (59) disposed at said low pressure compressor input (56) and a second check-valve (59) disposed at said high pressure compressor output (62), wherein said first and second check-valves (59) prevent a reverse air flow through said inverted function turbocharger when said inverted function turbocharger is in a choking state.

16. The internal combustion engine of claim 13, further comprising a bypass valve connected to said turbine input for directing said exhaust flow to said turbine input during a part-load operation of the engine (12).

17. The internal combustion engine of claim 16, wherein said exhaust flow is directed by said bypass valve away from said turbine input and to a second turbocharger for compressing air into said internal combustion engine during a full-load operation of the engine (12).

18. The internal combustion engine of claim 13, further comprising a balanced pressure plenum junction regulator (82) for venting gas pressure increases and vapor caused by an amount of blow-by into said individually partitioned cylinder crankcases (46, 48, 50, 52), the balanced pressure plenum junction regulator (82) comprising a regulator body (90), a high pressure inlet orifice (84) connected at said high pressure compressor output (62), a low pressure inlet orifice (86) connected to said low pressure compressor input (56), and a calibrated orifice (88) connected to an engine intake manifold.

19. The internal combustion engine of claim 18, wherein said high pressure inlet orifice (84) and said low pressure inlet orifice (86) comprise equal diameters.

20. The internal combustion engine of claim 18, further comprising an electrical heating element (92) at said low pressure inlet orifice (86) for heating said low pressure inlet orifice (86) to prevent a formation of ice.

21. The internal combustion engine of claim 18, wherein said balanced pressure plenum junction regulator (82) is located in a close proximity to said inverted function turbocharger to prevent a formation of ice.

22. The internal combustion engine of claim 18, further comprising a balanced pressure plenum junction regulator (82) manufactured from a heat conductive material and connected to said inverted function turbocharger for warming of said regulator body.

23. A method for improving an Otto intake cycle of an internal combustion engine comprising:
providing at least two enclosed and individually partitioned dry-sump cylinder crankcases (46, 48, 50, 52) in pneumatic closed loop connection, each defining an air volume between an underside of a piston (18), a wall of a cylinder (16), and a crankshaft bearing support girdle (68) separating said dry-sump cylinder crankcases (46, 48, 50, 52) from a wet-sump crankcase (38);
controlling at least two synchronized evacuation valves (64) disposed between said individually partitioned cylinder crankcases (46, 48, 50, 52) and said pump (58), said evacuation valves (64) being operable between an open position for allowing air flow from said individually partitioned cylinder crankcases (46, 48, 50, 52) and a closed position for restricting air flow from said individually partitioned cylinder crankcases (46, 48, 50, 52) into said pump (58);
controlling at least two synchronized expansion valves (66) disposed between said individually partitioned cylinder crankcases (46, 48, 50, 52) and said pump (58), said expansion valves (66) being operable between an open position for allowing air flow into said individually partitioned cylinder crankcases (46, 48, 50, 52) and a closed position for restricting air flow into said individually partitioned cylinder crankcases (46, 48, 50, 52) from said pump (58); and
providing a pump to evacuate said air volumes of said individually partitioned cylinder crankcases (46) that are undergoing an intake cycle when said evacuation valves (64) of said individually partitioned cylinder crankcases that are undergoing the intake cycle (46) are open and displacing said evacuated air volumes to said individually partitioned cylinder crankcases (46) that are undergoing an exhaust cycle when said expansion valves (66) of said individually partitioned cylinder crankcases undergoing the exhaust cycle are simultaneously open.

24. The method of claim 23, wherein said pump is an inverted function turbocharger comprising a turbine input for receiving an exhaust flow from the internal combustion engine to induce a rotation of a turbine connected to a common shaft and a compressor connected to said common shaft for creating a low pressure state at a low pressure compressor input (56) and a high pressure state at a high pressure compressor output (62).

25. The method of claim 24, further comprising diverting said exhaust flow away from said turbine input as the engine transitions from a part-load operation to a full-load operation.

26. The method of claim 25, further comprising diverting said exhaust flow from said turbine input to a second turbocharger for compressing air into the internal combustion engine.

27. The method of claim 23, further allowing an overpressure of said displaced air volumes within said individually partitioned cylinder crankcases (46, 48, 50, 52) that are undergoing an exhaust Otto cycle to overflow into a larger volume.

28. The method of claim 27, wherein said larger volume comprises a volume of said wet-sump crankcase (38) and a cylinder head cover (22) volume.

29. The method of claim 28, wherein said larger volume is at least twice as large as said individually partitioned cylinder crankcase air volumes.

30. The method of claim 24, further comprising venting a gas pressure increase and a vapor caused by an amount of blow-by entering said individually partitioned cylinder crankcases (46, 48, 50, 52)) to an intake manifold.

31. The method of claim 30, wherein said venting comprises using a balanced pressure plenum junction regulator (82) comprising a body (90), a high pressure inlet orifice (84) connected at said high pressure compressor output (62), a low pressure inlet orifice (86) connected to said low pressure compressor input (56), and a calibrated orifice (88) connected to an engine intake manifold.

32. The method of claim 23, further comprising maintaining an optimal homogeneous stoichiometric fuel/air mixture of the Otto cycle throttled internal combustion engine.

* * * * *